US012412064B2

United States Patent
Greer et al.

(10) Patent No.: US 12,412,064 B2
(45) Date of Patent: *Sep. 9, 2025

(54) METHODS AND APPARATUS TO SECURE COMMUNICATION DEVICES TO WRISTBANDS

(71) Applicant: ZEBRA TECHNOLOGIES CORPORATION, Lincolnshire, IL (US)

(72) Inventors: Mark M. Greer, Dardenne Prairie, MO (US); Michael S. Thieme, Lake St. Louis, MO (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,507

(22) Filed: Dec. 4, 2023

(65) Prior Publication Data

US 2025/0181881 A1 Jun. 5, 2025

Related U.S. Application Data

(63) Continuation of application No. 16/747,516, filed on Jan. 20, 2020, now Pat. No. 11,836,564.

(51) Int. Cl.
*G06K 19/077* (2006.01)

(52) U.S. Cl.
CPC .............. *G06K 19/07762* (2013.01)

(58) Field of Classification Search
CPC ............ G06K 19/07762; G06K 19/00; G06K 19/067; G06K 19/07
USPC .................. 235/492, 487, 380, 375
See application file for complete search history.

(56) References Cited

U.S. PATENT DOCUMENTS

| 2003/0177681 | A1* | 9/2003 | Riley | G09F 3/005 40/633 |
| 2020/0201262 | A1* | 6/2020 | Verdickt | G04F 1/005 |
| 2021/0224628 | A1* | 7/2021 | Greer | G06K 19/0723 |

* cited by examiner

*Primary Examiner* — Edwyn Labaze

(57) ABSTRACT

An example disclosed sheet includes a first layer; a second layer; a first die cut in the second layer defining a first wristband section and a second wristband section separated by a fold line; a second die cut in the first layer defining an imaging area; and a third die cut in the second layer defining an aperture in the second wristband section; wherein the aperture is surrounded by an adhesive and the aperture has an aperture dimension, the aperture dimension is greater than an inner dimension of the communication device, and the aperture dimension is less than an outer dimension of the communication device.

16 Claims, 6 Drawing Sheets

METHODS AND APPARATUS TO SECURE COMMUNICATION DEVICES TO WRISTBANDS

FIELD

Examples disclosed herein are related to wristbands and, more particularly, methods and apparatus to secure communication devices to wristbands.

DETAILED DESCRIPTION

Figure 1:
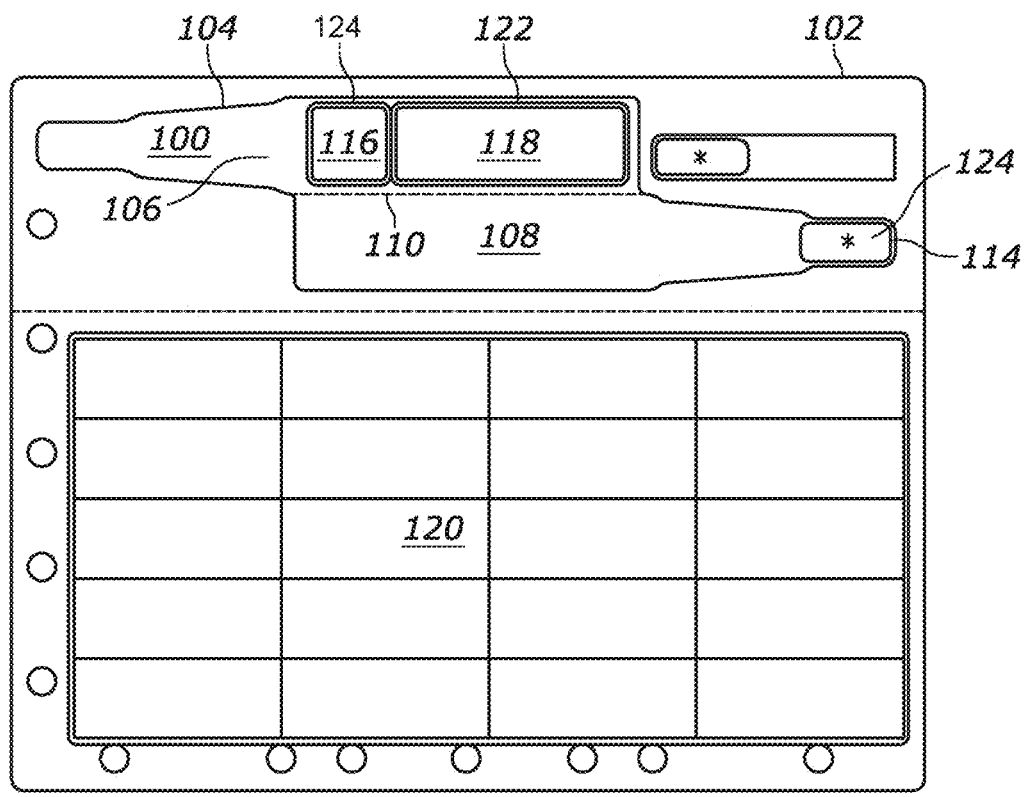
FIG. 1 depicts a first side of an example carrier containing an example wristband constructed in accordance with teachings of this disclosure.

Some wristbands are removably integrated into a carrier. The carrier is fed through a printer that is programmed to generate indicia on particular areas of the carrier, some of which correspond to areas on the removable wristband. The indicia is, for example, human-readable text, a barcodes, or graphics. In addition to the printed indicia, some wristbands carry communication devices that store machine-readable data. For example, a passive radio frequency identification (RFID) tag having an identifier stored thereon may be permanently and fully embedded between layers (i.e., completely housed in and covered by layers) of the wristband. In such instances, the passive RFID tag includes a flat antenna implanted within the wristband.

However, for certain applications or scenarios, passive RFID tags are not sufficient and other type(s) of communication devices are required. Passive RFID tags do not include an internal power source and, thus, rely on externally provided energy to operate. Specifically, passive RFID tags backscatter a signal provided by an external device (e.g., an RFID reader) to communicate data stored in a chip to the external device.

Other types of communication devices, such as an active RFID tag, includes an internal power source and, thus, can operate without reliance on an external power source. Active RFID tags can be configured to transmit signals periodically using the internal power source. Because the active RFID tags do not rely on external device for energy, active RFID tags are preferred in some applications. For example, a hospital may want to continuously know the location of objects, such as patients, devices and/or inventory, throughout the hospital. Active RFID tags can be adhered to (or otherwise carried by) the objects to be located and configured to periodically transmit signals (e.g., beacons) to strategically placed RFID readers throughout the hospital. A locationing system including in communication with the RFID readers, which have known locations, receive the signals and calculate locations for the RFID tags based on the transmitted signals (e.g., using a triangulation technique and/or based on beacon).

Examples disclosed herein provide a quick and secure attachment of a communication device, such as an active RFID tag, to an object, such as a wristband. While examples disclosed herein are described in connection with active RFID tags and wristbands, teachings of this disclosure are applicable to any suitable device for which attachment to any object is desired.

An example wristband disclosed herein includes an aperture for receiving the communication device. The aperture of the example wristband is sized to allow an insertion portion of the communication device to pass through the aperture and to prevent a securing portion of the communication from passing through the aperture. Instead of passing through the aperture, the securing portion is positioned in a fold-over portion of a layer of the wristband. The fold-over portion of the wristband folds over and is adhered to itself to fasten the securing portion of the communication device within the fold-over portion (e.g., along with imaging areas of the wristband as described in some examples detailed below). With the communication device secured within the fold-over portion, the wristband can be attached to, for example, a person.

As described in detail below, a user attaching the communication device to the wristband inserts the insertion portion of the communication device into the aperture and folds the fold-over portion of the wristband such that the material around the aperture is adhered to the area of the wristband including the securing portion of the communication device, thereby sealing the securing portion of the communication device between layers of the wristband.

Figure 2:
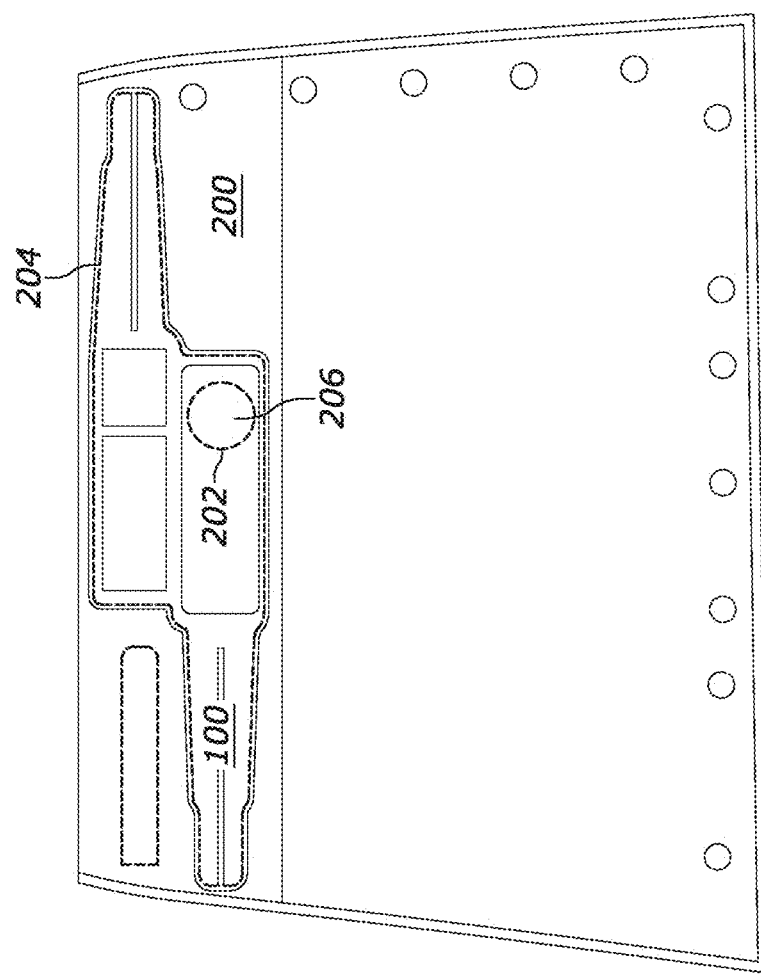
FIG. 2 depicts a second side of the example carrier of FIG. 1 opposite the first side.

An example multi-layer carrier 102 including a wristband 100 constructed in accordance with teachings of this disclosure is shown in FIGS. 1 and 2. The example depicted in FIG. 1 depicts the carrier 102 as a sheet, but the carrier 102 can be another other suitable type of carrier, such as a roll of wristbands (e.g., as described below in connection with FIG. 7). Alternatively, the example wristband 100 can be provided separately as an individual unit (e.g., as described below in connection with FIG. 8).

The example carrier 102 of FIGS. 1 and 2 includes a first layer, a second layer, and adhesive between the first and second layers at certain locations on the carrier 102. The view of FIG. 1 shows the first layer, which is sometimes referred to as a facesheet layer. In the example depicted in FIG. 1, the first layer is paper. The first layer is capable of receiving printed indicia from, for example, a media processing device (e.g., laser printer) programmed to generate the indicia at particular areas on the carrier 102, including an imaging area 118 shown in FIG. 1. In particular, the example carrier 102 of FIG. 1 is fed through the media processing device with the wristband 100 attached to the carrier 102. Once the indicia is generated on, for example, the imaging area 118, the wristband 100 is removed from the carrier 102.

The view of FIG. 2 shows the second layer. The second layer forms a side of the carrier 102 opposite the side formed by the first layer. In the illustrated example depicted in FIGS. 1 and 2, the second layer is plasticine. In some embodiments, the second layer is a resilient material, such as plastic or nylon. In the example of FIGS. 1 and 2, the second layer is translucent.

A plurality of die cuts in the layers of the carrier 102 define the wristband 100 and certain areas of the wristband 100, such as the imaging area 118. The die cuts enable the wristband 100 to be removed from the carrier 102 and for portions of the first layer to separate from remaining portions of the first layer so that portions of the first layer that are adhered to corresponding portions of the second layer are separable from the carrier 100 together to form the wristband 100. Specifically, some portions of the first layer are adhered to the second layer, such that the adhered portions of the first layer remain attached to the second layer upon removal of the wristband 100 from the carrier 102.

In the illustrated example, portions of the first layer corresponding to the imaging area 118, an attachment patch 124, and a placement area 116 are adhered to the second layer such that the imaging area 118, the attachment patch 124, and the placement area 116 are removed along with the second layer when the wristband 100 is detached from the carrier 102 (e.g., by pushing on the wristband 100).

As shown in the view of FIG. 2, a first die cut 204 in the second layer defines an outline of the wristband 100. That is, the first die cut 204 corresponds to an outer edge of the wristband 100 when detached from the carrier 102.

As shown in the view of FIG. 1, a second die cut 122 in the first layer defines the imaging area 118 configured to receive printed indicia, such as a patient name or identifier. In the illustrated example, the second die cut 122 is a rectangle with rounded corners. Notably, the portion of the first layer positioned within the second die cut 122 is adhered to the corresponding portion of the second layer.

As shown in the view of FIG. 1, a third die cut 114 in the first layer defines the attachment patch 124. The portion of the first layer within the third die cut 114 is releasably adhered (e.g., using a release layer) to the corresponding portion of the second layer, which includes of a layer of adhesive for use in securing the wristband 100 to a wearer.

As show in the view of FIG. 1, a fourth die cut 124 in the first layer defines the placement area 116. As described in detail below, the placement area 116 is a location on the wristband 100 at which a communication device is attached to the wristband 100. The portion of the first layer within the fourth die cut 124 is adhered to the corresponding portion of the second layer.

Accordingly, when a force is applied within the outline formed by the first die cut 204, the wristband 100 detaches from the carrier 102 and includes the portion of the second layer positioned with the first die cut 204, the portion of the first layer corresponding to the imaging area 118, the portion of the first layer corresponding to the attachment portion 114, and the portion of the first layer corresponding to the placement area 116.

As shown in the view of FIG. 2, a fifth die cut 202 in the second layer defines a device receiving aperture 206 configured to receive, for example, an RFID tag. Notably, the device receiving aperture 206 is not an aperture until the wristband 100 is removed from the carrier 102. In the illustrated example, the portion of the second layer within the fifth die cut 202 is adhered to the corresponding portion of the first layer such that the portion of the second layer within the fifth die cut 202 remains on the carrier 102 when the wristband 100 is detached from the carrier 102.

Figure 3:
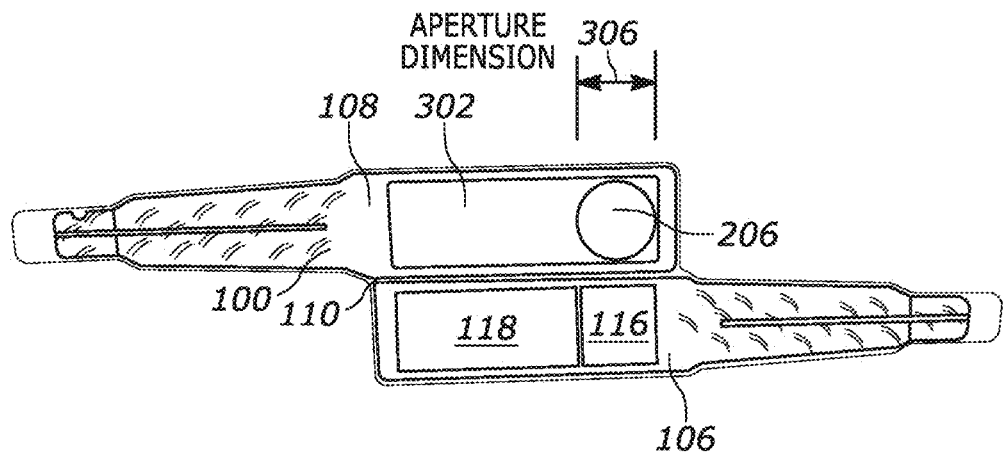
FIG. 3 depicts the example wristband of FIGS. 1 and 2 removed from the carrier.

FIG. 3 shows the wristband 100 removed from the carrier 102. The wristband 100 has a first wristband section 106 and a second wristband section 108 separated by a fold line 110. The first wristband section 106 includes the imaging area 118 (formed by the first layer) and the placement area 116 (formed by the first layer). In the illustrated example, the imaging area 118 received printed indicia from a media processing device prior to the wristband 100 being detached from the carrier 102. Example data to be imaged on the imaging area 118 includes a photographic image of the wearer, a barcode identifying the wearer, a trademark or logo, etc.

Figure 5:
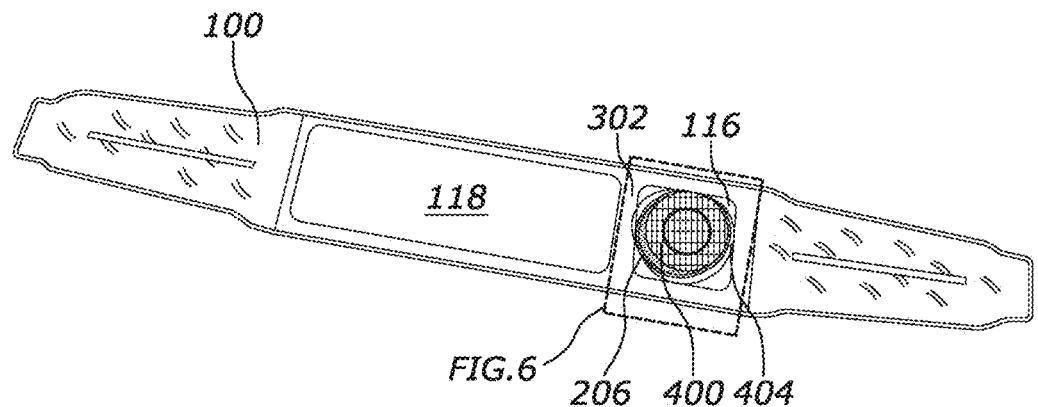
FIG. 5 depicts the example wristband of FIGS. 1, 2, and 3 with the example communication device of FIG. 4 secured thereto by way of a lamination of the wristband.

The second wristband section 108 includes a lamination area 302 (formed by the second layer). The lamination area 302 is designed such that when the second wristband section 108 is folded atop the first wristband section 106 along the fold line 110, the lamination area 302 covers and protects (e.g., laminates) the imaging area 118. In the illustrated example, the lamination area 302 is translucent to allow viewing of the imaging area 118 and the indicia printed thereon. At least a portion of the lamination area 302 is covered by adhesive. The portion of the lamination area 302 containing the adhesive may be a small percentage of the lamination area 302 (e.g., an outline along the outer edge) or it may be the entire lamination area 302. The adhesive on the lamination area 302 adheres the first wristband section 106 to the second wristband section 108 to place the wristband 100 in a state ready for attaching to a wearer (as shown in FIG. 5).

The lamination area 302 includes the device receiving aperture 206 having an aperture dimension 306. Although the aperture 206 is depicted in the illustrated example as a circle to receive a circular communication device, the aperture 206 may be any suitable shape that is correspondingly shaped with the communication device to be received therein. That is, the aperture 206 can be of any shape to accommodate alternatively shaped communication devices. As the aperture 206 illustrated in the example of FIG. 3 is circular, the aperture dimension 306 is a diameter. Alternatively, if the aperture 206 was, for example, a rectangle, the aperture dimension 306 would be, for example, a width or length or combination thereof.

In the depicted embodiment, the aperture 206 is positioned on the second wristband section 108 across the fold line 110 from the placement area 116 at which a communication device, such as an RFID tag is placed for securing to the wristband 100. Thus, when the second wristband section 108 is folded atop the first wristband section 106, the aperture 206 aligns with the placement area 116. This configuration results an aperture-shaped portion of the first wristband section 106 corresponding to the placement area 116 not being laminated and the portion surrounding the placement area 116 being laminated.

As further described below, by placing a communication device on the placement area 116, the aperture 206 folds over the communication device, allowing one portion of the communication device to pass through the aperture 206 and securing another portion of the communication device between the first and second wristband sections 106 and 108.

Figure 4:
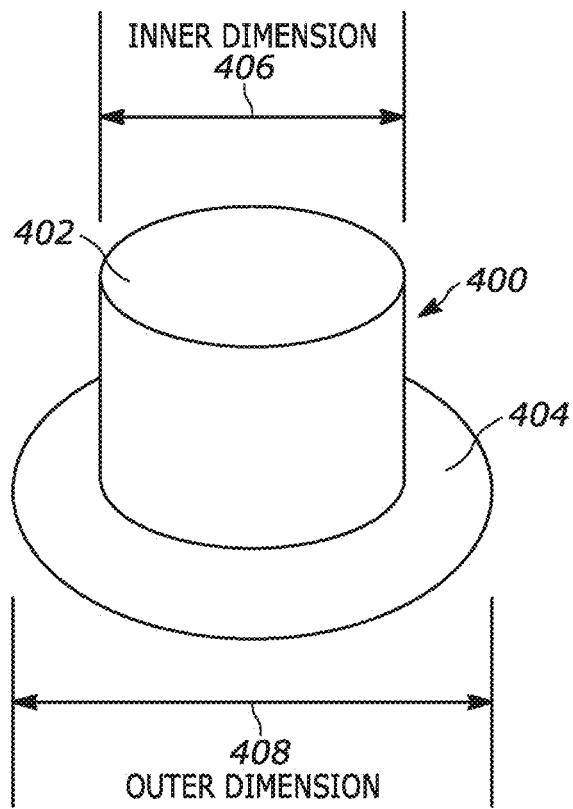
FIG. 4 depicts an example communication device constructed in accordance with teachings of this disclosure.

FIG. 4 shows an example communication device 400 constructed in accordance with teachings of this disclosure. The example communication device 400 includes an insertion portion 402 having an inner dimension 406 and a securing portion 404 having an outer dimension 408. As the example communication device 400 of FIG. 4 is circular, the inner dimension 406 and the outer dimension 408 are diameters and are sometimes referred to herein as diameters. However, differently shaped communication devices may have different dimensions, such as inner and outer widths, or inner and outer lengths.

The communication device 400 is, for example, a radio frequency identification tag, a Bluetooth beacon, an ultra-wide band (UWB) tag, a near field communication (NFC)

tag, or any other suitable type of device. As depicted in FIG. 4, the example communication device is an RFID tag. In some embodiments, the securing portion 404 and the insertion portion 402 are part of the same structure (i.e., are integrally formed). In some embodiments, the securing portion 404 is a flange attached to a surface of the insertion portion 402. The securing portion 404 is, for example, plastic, paper, fiberglass, laminate, or any other material that is resilient such that retention of the securing portion 404 results in the communication device 400 being secured to the wristband 100.

The example communication device 400 as shown in FIG. 4 is an active RFID tag. As is noted above, active RFID tags require a larger housing relative to passive RFID tags, to house a battery, an antenna, circuitry, etc. Due to the larger housing, active RFID tags cannot be sealed flat between the first and second portion of the wristband and must be retained in some other way (as addressed by teachings of this disclosure). The aperture 206 allows for the larger housing of active RFID tags to protrude while other portions of the active RFID tag are retained.

Notably, the outer diameter 408 is greater than the inner diameter 406. The difference in the outer diameter 406 and the inner diameter 408 allows the insertion portion 402 to pass through the aperture 206 while the securing portion 404 is unable to pass through the aperture 206. The aperture diameter 306 is greater than the inner diameter 406, and the aperture diameter 306 is lesser than the outer diameter 408. This allows the aperture 206 to pass over the insertion portion 402 of the communication device 400 with the communication device 400 positioned on the placement area 116, and the area of the lamination area 302 surrounding the aperture 206 to contact the second wristband section 106, thereby trapping the securing portion 404 in between the first and second wristband sections 106 and 108, which will secure the communication device 400 to the wristband 100.

In other examples configured for differently shaped communication devices, such as a rectangular RFID tag, the outer width or length is less than the inner width or length to enable the insertion portion of the communication device to pass through the aperture but not the securing portion. That is, alternatively shaped apertures are sized correspondingly to the shape of communication device to be received therethrough.

FIG. 5 shows the wristband 100 folded along the fold line 110 such that the first wristband section 106 and the second wristband section 108 are overlaid and the communication device 400 is secured therebetween. When the second wristband section 108 overlays the first wristband section 106, the lamination area 302 laminates the imaging area 118. The lamination protects the imaging area 118 such that any indicia printed thereon will not be directly smudged, scratched, dissolved, or otherwise damaged. When the second wristband section 108 is folded over the first wristband section 106, the aperture 206 aligns with the placement area 116. As is depicted in FIG. 5, when the communication device 400 is positioned on the placement area 116, the second wristband section 108 is folded over the first wristband section 106 along the fold line 110, the aperture 206 passes over the communication device 400.

Figure 6:
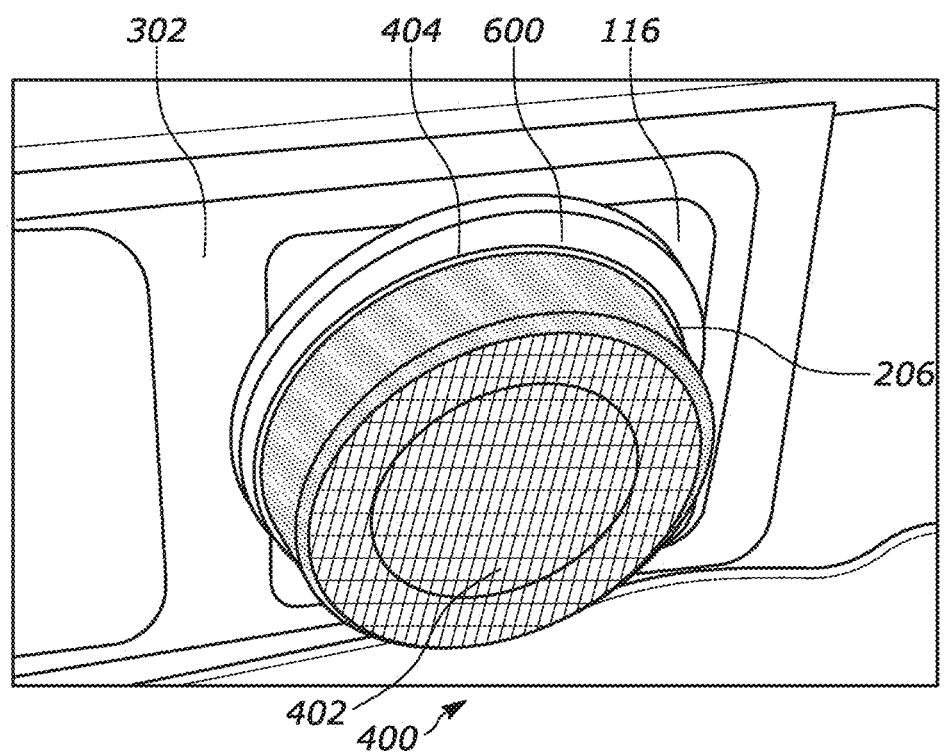
FIG. 6 is a view of a device receiving area of the wristband of FIGS. 1, 2, 4, and 5.

An enhanced view of box F.6 around the communication device 400 is shown in FIG. 6. That is, FIG. 6 depicts a close-up of the communication device 400 and the aperture 206 of FIG. 5. In FIG. 6, the surfaces of the communication device 400 can be seen, which includes the insertion portion 402 and the securing portion 404. As shown in FIG. 6, the insertion portion 402 is small enough to fit through aperture 206, however the securing portion 404 is not. Therefore, when the second wristband section 108 is folded over to laminate the first wristband section 106, the lamination area 302 retains the securing portion 404 of the communication device 400. The lamination area 302 features adhesive which allows the lamination area 302 to adhere to surfaces that it contacts. In the example of FIG. 6, the lamination area 302 adheres to areas surrounding (and perhaps including) the placement area 116.

As depicted in FIG. 6, an overlap area 600 of the lamination area 302 is where the lamination area 302 contacts the securing portion 404 of the communication device 400. The lamination area 302 retains the securing portion 404 in part due to the contact in the overlap area 600. In some embodiments, the lamination area 302 in the overlap area 600 has adhesive. As the lamination area 302 has contact with the securing portion 404 and the areas of the lamination area 302 outside of the overlap area 600 are adhering to the first wristband section 106, the securing portion 604 will be secured between the lamination area 302 and the placement area 116.

Figure 7:
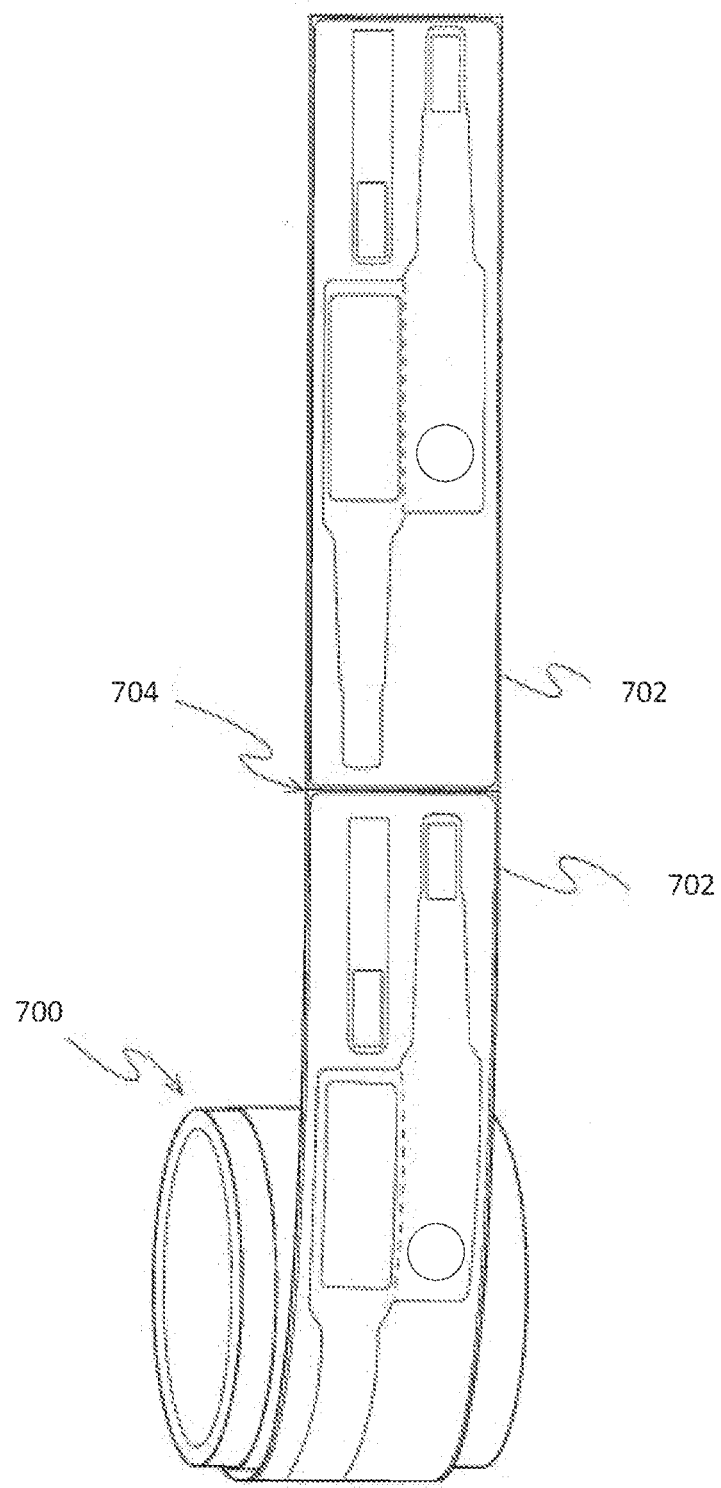
FIG. 7 depicts another example carrier including another example wristband constructed in accordance with teachings of this disclosure.

FIG. 7 illustrates another example constructed in accordance with teachings of this disclosure. The example of FIG. 7 is another example carrier, roll 700 that contains a chain of carriers 702. In FIG. 7, each carrier 702 is removeable from the roll 700 via perforations 704 between the individual carriers 702. In some embodiments, the carrier 702 is processed by a media processing device prior to separating from the roll 700. While the carrier 102 described above is capable of being processed by a laser printer, the roll 700 is capable of being processed by a thermal printer. Each carrier 702 functions similar to the two-layered carrier 102 described above. A wristband is diecut within the carrier 702 such that the wristband can be removed from the carrier 702. Each wristband contains an aperture similar to the aperture 206 discussed above. The wristband has a fold line, where opposite the fold line is adapted to receive a communication device. An imaging area receives indicia to be generated on the wristband by, for example, a thermal printer. When the wristband is folded over the fold line 710, the aperture may pass over and secure a communication device as described above.

Figure 8:
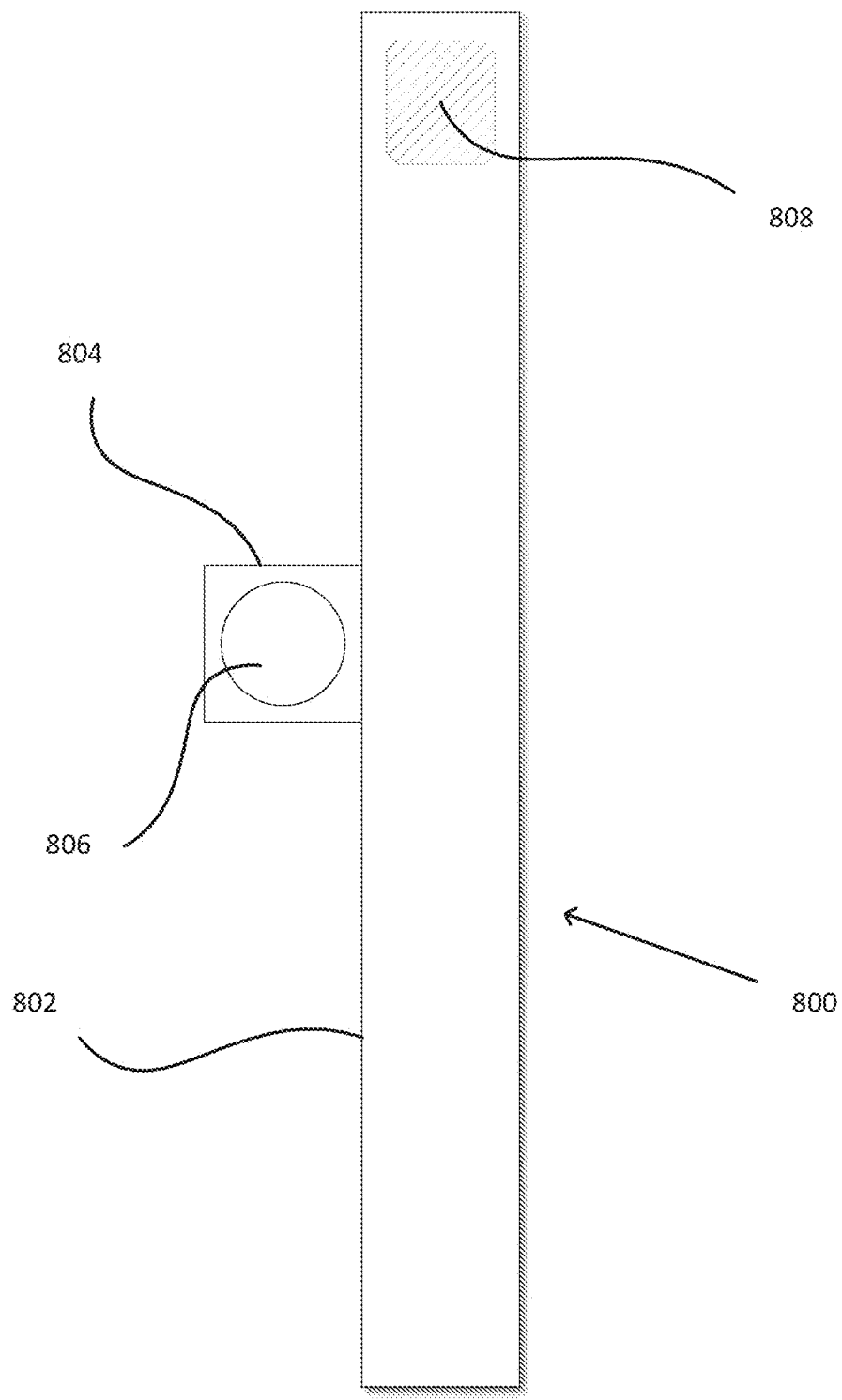
FIG. 8 depicts another example wristband constructed in accordance with teachings of this disclosure.

FIG. 8 depicts another example wristband 800 constructed in accordance with teachings of this disclosure. The example wristband 800 of FIG. 8 includes a strap 802 and a tab 804 extending from a side edge of the strap 802. The tab 804 may be located at any point along a length of the strap 802, and the tab 804 may have a width up to the length of the strap 802.

The tab 804 includes an aperture 806. In the illustrated example, the aperture 806 is completely contained within the tab 804. In the depicted embodiment, the surface of the tab 804 around the aperture 806 include adhesive, such that when the tab 804 is folded over onto the strap 802, the adhesive would adhere the tab 804 to the strap 802.

Like the aperture 206 of FIG. 6, the aperture 806 of FIG. 8 is sized to receive a communication device. The communication device is capable of being placed on the strap 802 opposite from the tab 804, the communication device then being inserted through the aperture 806 such that the aperture 806 fits over the communication device and secures the communication device to the strap 802.

The wristband 802 has a securing mechanism 808 at an end. FIG. 8 depicts the securing mechanism as an adhesive capable of adhering opposite ends of the strap 802 together. The securing mechanism 808 can be any means for securing one end of the strap 802 to the other end to loop the wristband 800 around a wearer's wrist. Other wristband embodiments may include securing mechanisms featuring a snap and peg feature, a locking feature, or other similar securing method known for wristbands.

The illustrations described herein are intended to provide a general understanding of the structure of various embodiments. The illustrations are not intended to serve as a complete description of all of the elements and features of apparatus that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents and shall not be restricted or limited by the foregoing detailed description.

That which is claimed:

1. A carrier including a detachable wristband, the carrier comprising:
   first and second wristband section defined by a first die cut;
   a fold line between the first and second wristband sections, the first wristband section and the second wristband section joined by and asymmetrically disposed about a fold line
   an imaging area defined by a second die cut in the first wristband section adjacent to a placement area; and
   an aperture defined by a third die cut in the second wristband section,
   wherein when the second wristband section is folded over the fold line, the second wristband section overlays the first wrist band section and the aperture aligns with and overlays the placement area and is configured and dimensioned to retain a first portion of a radiofrequency device against the placement area while the aperture is configured and dimensioned to allow a second portion of the radiofrequency device to extend through the aperture.

2. The carrier of claim 1, wherein, when the communication device is positioned on a placement area located on the first wristband section and the second wristband section is folded along the fold line, an insertion portion of the communication device passes through the aperture and a securing portion of the communication device is secured between the first and second wristband sections.

3. The carrier of claim 1, wherein, when the first wristband section is folded along the fold line and brought into contact with the first wristband section, the first and second wristband sections are adhered together.

4. The carrier of claim 1, wherein the first wristband section has a first attachment section and the second wristband section has a second attachment section, and when the wristband forms a closed loop when the first attachment section contacts the second attachment section.

5. The carrier of claim 1, wherein the wireless communication device is an active radio frequency identification tag.

6. The carrier of claim 1, wherein the wireless communication device is a Bluetooth beacon.

7. The carrier of claim 1, wherein the insertion portion and the securing portion are integrally formed.

8. The carrier of claim 1, wherein the aperture is shaped correspondingly with the communication device.

9. The carrier of claim 1, wherein the aperture, inner, and outer dimensions are diameters.

10. A wristband comprising:
    a first wristband section including an imaging area configured to receive indicia and a placement area to receive a first portion of a radiofrequency device;
    a second wristband section joined to the first wristband section by and asymmetrically disposed about a fold line; and
    an aperture formed in the second wristband section, wherein when the second wristband section is folded over the fold line, the second wristband section overlays the first wrist band section and the aperture aligns with and overlays the placement area and is configured and dimensioned to retain a first portion of a radiofrequency device against the placement area while the aperture is configured and dimensioned to allow a second portion of the radiofrequency device to extend through the aperture.

11. The wristband of claim 10, wherein the aperture is circular.

12. The wristband of claim 10, wherein the communication device is an active radio frequency identification tag.

13. The wristband of claim 10, wherein the first wristband section has a first attachment section and the second wristband section has a second attachment section, wherein when the wristband forms a closed loop the first attachment section contacts the second attachment section.

14. The wristband of claim 10 wherein the imaging area is part of a first layer and the first and second wristbands sections are part of a second layer.

15. The wristband of claim 10, wherein the first layer is a first layer and the second layer is a second layer.

16. The wristband of claim 10, wherein the aperture, inner, and outer dimensions are diameters.

* * * * *